United States Patent [19]
Chamberlain

[11] Patent Number: 5,172,953
[45] Date of Patent: Dec. 22, 1992

[54] PICKUP TRUCK BED LINER AND BALLAST

[76] Inventor: Eugene R. Chamberlain, 18086 Fruitport Rd., Spring Lake, Mich. 49456

[21] Appl. No.: 679,891

[22] Filed: Apr. 3, 1991

Related U.S. Application Data

[63] Continuation-in-part of Ser. No. 560,210, Jul. 31, 1990, abandoned.

[51] Int. Cl.$^5$ .............................................. B62D 33/00
[52] U.S. Cl. ................................... 296/39.2; 280/757; 280/759
[58] Field of Search .................. 296/39.1, 39.2, 37.6; 280/757, 759; 105/423

[56] References Cited

U.S. PATENT DOCUMENTS

| | | | |
|---|---|---|---|
| 831,647 | 9/1906 | Dodds | 105/423 |
| 2,784,027 | 3/1957 | Temp | 296/37.6 X |
| 3,159,420 | 12/1964 | McCrossen | 296/39.2 X |
| 3,480,321 | 11/1969 | Brandt et al. | 296/39.2 X |
| 4,318,659 | 3/1982 | Willer et al. | 296/39.2 X |
| 4,333,678 | 6/1982 | Munoz et al. | 296/39.2 |
| 4,394,100 | 7/1983 | Sperlich | 296/183 X |
| 4,505,508 | 3/1985 | Carter et al. | 296/39.2 |
| 4,592,583 | 6/1986 | Drossen et al. | 296/39.2 |
| 4,623,187 | 11/1986 | Ibrahim | 296/64 X |
| 4,767,149 | 8/1988 | Rye | 296/39.2 |
| 4,796,914 | 1/1989 | Raynor | 280/757 |
| 4,941,702 | 7/1990 | Southward | 296/37.6 |

FOREIGN PATENT DOCUMENTS

| | | | |
|---|---|---|---|
| 0375621 | 6/1990 | European Pat. Off. | 105/423 |
| 1140095 | 11/1962 | Fed. Rep. of Germany | 296/39.2 |
| 1166644 | 3/1964 | Fed. Rep. of Germany | 280/759 |
| 1439762 | 4/1966 | France | 296/39.1 |

Primary Examiner—Dennis H. Pedder
Attorney, Agent, or Firm—Varnum, Riddering, Schmidt & Howlett

[57] ABSTRACT

A bed liner for a pickup truck cargo area is disclosed wherein a ballast means is disposed about said liner in advantageous positions. An upper bed liner is mounted on the side wall of the pickup truck and compatibly retains a ballast media. Further, a floor bed liner incorporating a ballast means is disclosed.

12 Claims, 5 Drawing Sheets

PICKUP TRUCK BED LINER AND BALLAST

This application is a continuation-in-part of application Ser. No. 07/560,210, filed on Jul. 31, 1990, now abandoned.

BACKGROUND OF THE INVENTION

This invention relates to the field of pickup truck bed liners. More specifically, the invention relates to bed liners with accommodations for ballast.

Pickup trucks have great utility as working vehicles, and recently, they have enjoyed increased popularity for general use. This popularity appears to result from the value in having a vehicle that serves purposes both as transportation and as a carrier of cargo or tools. The design of the usual pickup truck causes it to suffer poor traction and poor ride characteristics. Truck manufacturers have improved upon these characteristics somewhat through advanced suspension system designs. Many truck owners have recognized the cause of the problems as the comparative lightness in weight in the rear of the pickup truck versus the front of the truck.

The recognition of the cause has resulted in self help solutions, typically the addition of some sort of ballast in the rear of the pickup truck bed. Many times these solutions are in the form of cement blocks, sand bags, tool cribs or other heavy materials that are readily available. The truck owner in maximizing the effectiveness of the ballast seeks to position it as far to the rear of the truck bed as possible, leading in some cases to extensions of the rear bumper that compatibly retain the ballast.

Another solution has resulted in the incorporation of ballast materials in a plastic form that compatibly fits within the framework of the inner side wall of the pickup truck cargo bed. This concept allows the ballast to be placed in an area that is not normally used as cargo space. The forms are specially designed to fit the existing contour of the inner side wall area and may be removed en masse to alter performance characteristics.

Still other solutions use the retention of ballast in compartments or containers held in the bed area. These units have other useful functions such as storage of tools or equipment. They do, however, detrimentally detract from the overall bed area, causing a corresponding reduction in the utility of the pickup truck cargo capacity.

The protection of the value of the pickup truck to its owner has led to certain innovations. One very effective product has become much sought after, and is many times offered as an option with the initial purchase of a new pickup truck. The product is known as a bed liner and is usually a plastic insert that is fitted to the interior of the pickup truck bed. The liner has the benefits of protecting the pickup truck bed from scratches and dents when cargo is being transported, and also prevents water, salt, snow or other potentially damaging materials from collecting on the surface of the pickup truck bed. Such materials still collect on the bed liner, but owing to its plastic construction, no harm results.

The bed liners are tailored to the individual truck requirements. Specifically, provisions are made in the liner design to accommodate tire wells that encroach into the bed area in the typical pickup truck. Further, the height and width dimensions are made compatible so as to maximize the coverage of the liner to the bed. In some cases attachment of the liner to the bed is made, resulting in what amounts to an integral unit.

The usage of the bed liner does not appreciably interfere with the utility of the cargo capacity of the pickup truck. Thus the benefits derived from the bed liner are not offset by some disadvantage.

The objectives of the present invention are to retain the benefits both of the ballast approach to resolving pickup truck performance characteristics and the protective results of bed liner installations. It is further an objective of the present invention to minimize the intrusion of any such installation in the cargo area of the pickup truck bed. Still another objective of the present invention is to provide a nonskid surface for carrying cargo while protecting the truck bed finish. As will be seen, these and other objectives are uniquely obtained in the embodiments of the present invention in a manner that advances the teachings of the previous and different approaches by unexpected and surprisingly efficient means.

SUMMARY OF THE INVENTION

In one aspect of the invention, the floor portion, wall portion, rear portion, and front portion of the protective liner are integrally connected to form a well which is adapted to retain ballast for providing stability and traction for the pickup truck. Preferably, the floor portion has a rib extending upwardly therefrom to support a horizontal panel. The rib may be disposed generally parallel to the wall portion.

The wall portion and the front portion can have a shoulder at an upper portion thereof located substantially the same distance from the floor portion as the top of the rib so that the shoulder and the rib can be adapted to support the horizontal panel. Preferably, the wall portion and the front portion have a flange spaced above the shoulder to form a channel which receives the panel. The panel is typically formed of plywood and the ballast is typically formed of a loose aggregate so that when the aggregate is received in the well, the panel received into the channel can cover the aggregate.

In one embodiment, the channel is integrally formed by a shoulder, a web, and a flange. The channel is adapted to receive the horizontal panel. In another embodiment, the channel is formed by a one-piece molding incorporating the shoulder and web and a separate rail is attached to a mounting support of the side wall, thereby creating a channel adapted to receive the horizontal panel. The rail may be secured to the mounting support by rivets, or may be retained by a retaining channel which extends along the mounting support of the side wall. A drainage channel may be incorporated on the side wall or the rib to channel water and other liquid from the bed liner.

In another aspect of the invention, the wall portions and front portion of the protective liner have an integral U-shaped channel adapted to receive a panel through the rear access opening of the pickup truck bed so that the panel can be retained closely adjacent the bed floor.

DETAILED DESCRIPTION OF THE PREFERRED EMBODIMENTS

Figure 1:
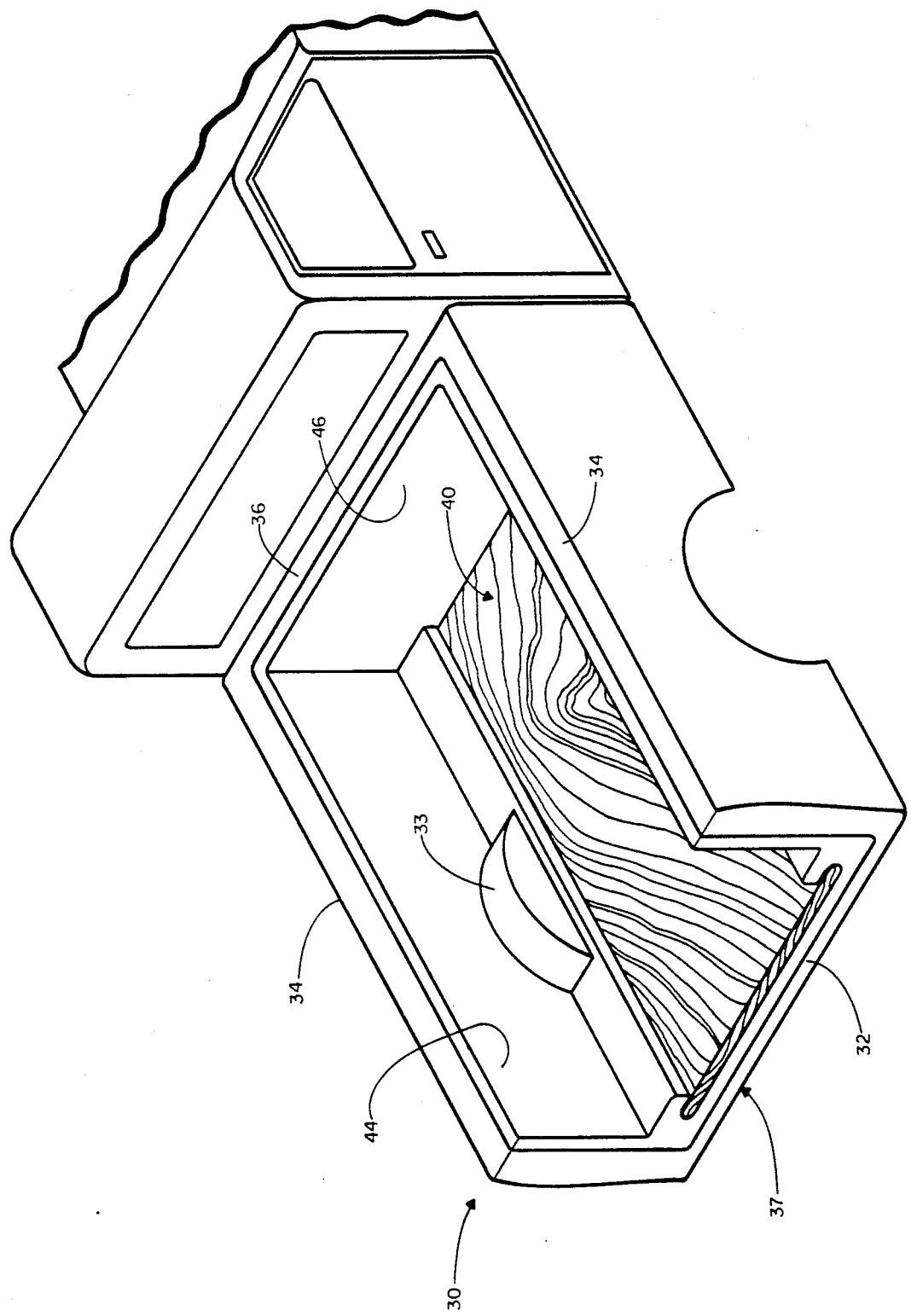
FIG. 1 is a perspective view of a bed liner in accordance with the present invention installed in a pickup truck.

In accordance with the present invention, an improved bed liner with provisions for ballast loads is shown in the drawings. In the norm, bed liners are installed for protection of the floor and/or walls in the pickup truck bed. The bed area is defined roughly as the area enclosed by the two side walls, the cab wall (the side wall next to the pickup cab), the tailgate wall and the floor. In most pickup trucks in use today, the bed area is interrupted somewhat by the intrusion of the rear tire wells. Most truck designs still allow for an unfettered four foot (4') by eight foot (8') floor area notwithstanding the tire well intrusion with the tailgate down.

Typical of the current design of the side walls and cab wall, is an inner contour that follows the shape of the outer wall construction. This increases the effective cargo area within the pickup truck bed, although for practical reasons this space may often be unusable. These features of the modern pickup truck will be discussed further in conjunction with the description of the present invention.

Although there are similarities in the truck designs, differences between the many makes and models do exist. Some of these differences require minor modifications to the embodiments as shown, however they are easily accomplished by one skilled in the art and do not represent a limitation on the scope of the present invention.

Other variations in truck design have been noted, including differences in the way the truck side walls are constructed. One version is formed from a single thickness of sheet metal, while others employ dual sheets. The dual "wall" versions include those that are two sheets formed in the same fashion and appear to be tack welded to each other. The other has a separately formed inner wall that presents a totally flush surface to the cargo area of the truck. As a result of these variations, certain modifications may have to be employed in the present invention, which again do not present any impediments in actual practice.

Many of the bed liners currently in use utilize fastening systems to secure the liner to the truck bed. Chief among these are the use of a lip at the top of the liner side walls that extends over the top of the adjacent truck side wall top. At various points corresponding to the location of the post holes in the top of the truck side walls, the liner lip may be turned into the post hole opening and secured further by an anchoring means. Other versions have shorter side walls that do not extend above the top of the truck side wall, and nest underneath the outwardly curved portion of the truck side wall in the area just below the toe. In this configuration, the liner is held in place by the memory of the plastic from which it is formed, or in some cases, fastening means such as screws or bolts are applied at intervals along the length of the liner side wall.

In those embodiments of the present invention where the ballast loads participate in weighing down the liner, it is a part of the concept that such loading assists in the placement and fixing of the bed liner invention. As opposed to fastening means, the effect of the ballast load is to secure the bed liner in its installed position without resorting to the previously mentioned fastening means which may scar or disfigure the truck. The feasibility of such installations is dependent on amount of ballast the truck owner desires to load, however, it is believed to be a distinct advantage over the prior art since the ballast loads are integrally fixed within the liner construction. In this fashion, fastening of the ballast load to the truck is also avoided.

In the present invention, the actual means of affirmatively fastening the liner to the pickup truck is not specifically claimed. The means by which the liners of the present invention may be fastened are well known in the art and are not further described within this specification.

Installation of a bed liner in accordance with the present embodiment occurs in a manner essentially the same as for a conventional bed liner system. Most conventional bed liner systems cover the floor, side walls and the cab wall of the cargo bed area. In addition, many also provide a liner for the tailgate area. The side walls of these conventional bed liners usually cover the tire well area. The liners are customized for this purpose as well as for overall fit and installation. These conventional liners are usually fabricated from plastic and are solid or webbed constructions maintaining low profiles. The advances in the bed liners of the present invention allow for ballast adjustment in the area of the pickup truck cargo bed.

The purpose of the ballast is to deliver apparent weight to the rear axle of the pickup truck. This enhances the traction of the rear wheels in inclement conditions such as rain snow or ice, and also improves the ride characteristics of the pickup by reducing the tendency of the rear axle to jump or buck.

Since the occasion for utilizing ballast loading may be weather dependent in some cases, the operator may desire to eliminate all ballast load from the pickup truck cargo bed during summer months. The ballast loads of the present embodiment are designed to allow easy entry and removal.

The installation of the ballast loads may differ depending on the characteristics of the particular pickup truck. The ballast media may be any material in common supply and possessing such weight per unit volume that would make it desirable for use as ballast. Typical of such media are sand, lead, slag, salt, and other heavy particulates.

The fabrication of the liner components would typically be by plastic molding. The usual molding methods compatible with the high impact and durable materials needed for use in the present embodiment are well known in the art and do not represent a part of the present invention.

In the preferred form of the present embodiment, the outer liner walls, the liner floor, the cab wall liner, and the tailgate liner would all be molded in one piece to the extent possible. The components would be brought together, fastened and sealed with caulking or by plastic welding at all the joints.

In the alternative, it is entirely plausible for the components to be formed individually and later assembled, the drawback being the added labor costs for the assembly work.

The ridges found on the liner floor allow for collection and channeling of water and debris. Especially where harsh winters prevail, the accumulation of damaging sheet ice is prevented through the use of the floor ridges.

The bed liner of the preferred embodiment is specific to the floor of the pickup truck bed. It may be used in conjunction with other conventional liner components, or with other compatible liner embodiments of the present invention. The deployment of the ballast is indiscriminate, because the ballast is allowed to spread throughout the well.

A version of this embodiment that at least partially resolves the ballast positioning problem is to use a segmented or compartmentalized floor liner. In this version (which is not shown specifically in the drawings) the containment cavity within the floor liner is limited to the rearward portion of the cargo bed. A further modification would allow the separate filling of several containment cavities allowing modest flexibility in the positioning of ballast loads.

FIGS. through 4 illustrate the preferred embodiment of the present invention wherein the ballast is retained in the bed of the pickup truck by the bed liner, and a low-cost, non-skid surface is associated therewith.

FIG. 1 shows a pickup truck box section 30 with the tailgate removed and with the cargo bed 32, tire well 33, bed wall 34, and cab wall 36 in typical relation. The bed liner 40 is shown installed in the box section 30. It can be seen that the bed liner 40 comprises a floor 42, opposing side walls 44, and a front end wall 46, and rear end wall 48.

Figure 2:
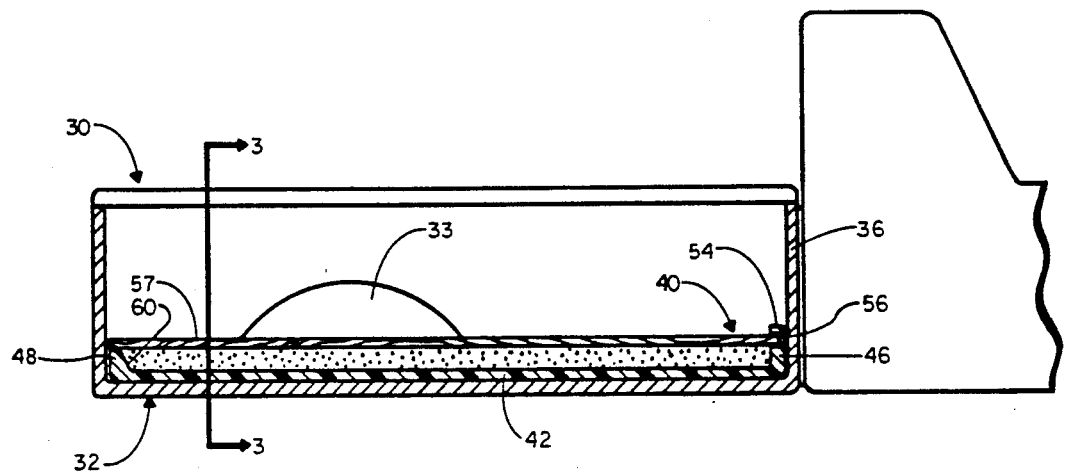
FIG. 2 is a side cross-sectional view of the protective bed liner of FIG. 1 without sides.
Figure 3:
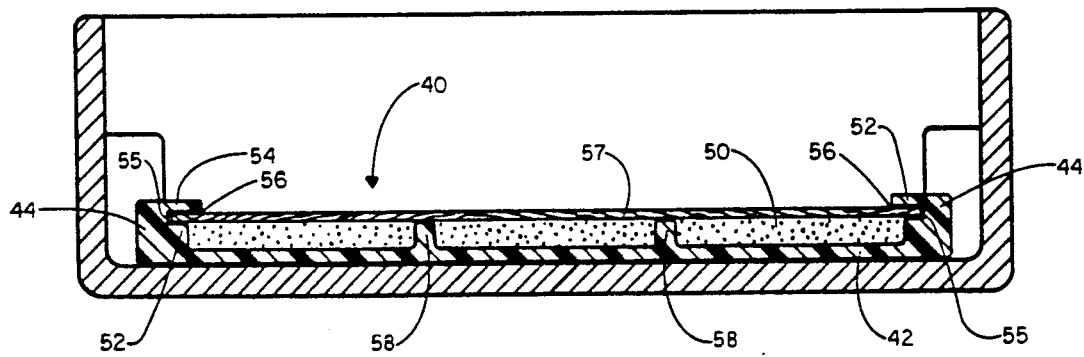
FIG. 3 is a rear cross-sectional view of the bed liner of FIG. 2 taken along line 3—3.
Figure 4:
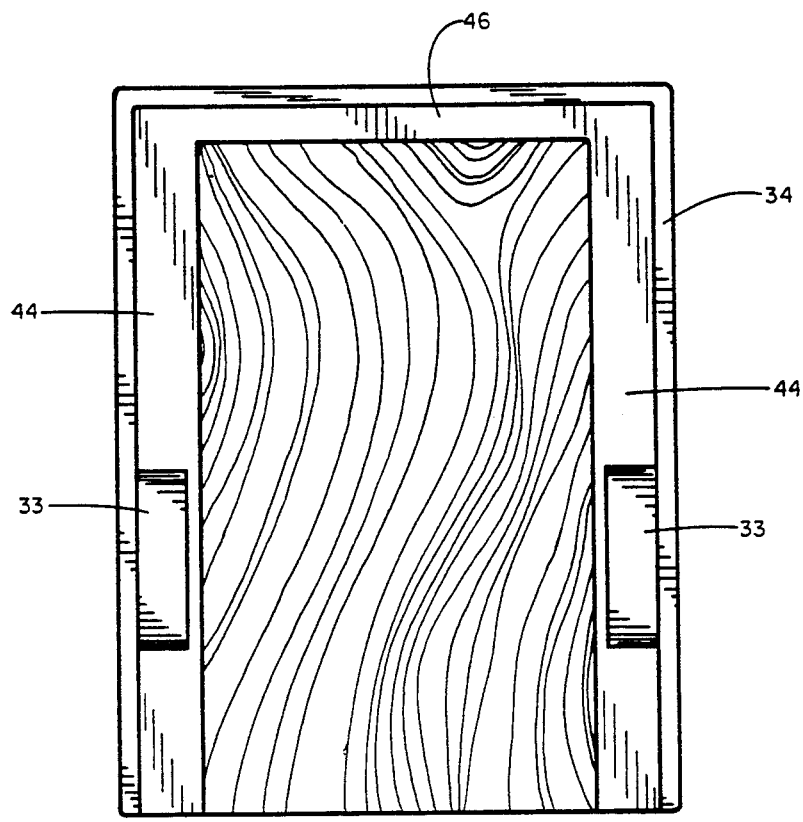
FIG. 4 is a top plan view of a pickup truck bed with the bed liner of FIG. 2 installed.

Considering now also FIGS. 2, 3 and 4, a well 50 is thus formed in the bed liner 40, and is adapted to receive ballast material such as sand or aggregate. A shoulder or ledge 52 is located in an upper portion of each side wall 44 and the front end wall 46, and a flange 54 extends from the side wall spaced from the shoulder by a web 55 to form a channel 56 in each side wall and the front end wall 46. The channel 56 is adapted to slidably receive a piece of conventional plywood 57 to form a non-skid support surface for the bed 32 of the pickup truck. Preferably, the ballast will be disposed in the well to a height no higher than the shoulder 52 upon which the plywood rests.

A pair of longitudinal supports 58 are disposed within the well 50, generally parallel to the side walls 44. The supports 58 serve to separate the ballast material, and also help support the plywood. The supports 58 may be formed integrally with the bed liner 40, or alternatively, may be discrete elements placed in the well prior to the introduction of the ballast. As can be seen in FIG. 2, the rear end wall 48 comprises a shoulder 60 which adds rigidity and strength to the rear end wall and also retains the ballast within the well 50. Preferably, the rear end wall 48 extends no higher than the shoulder 52 in order to permit passing the plywood over the rear end wall and into the channel 56.

It will be understood that the side walls 44, front end wall 46, and rear end wall 48 may be hollow or solid depending upon the manufacturing technique used.

Figure 5:
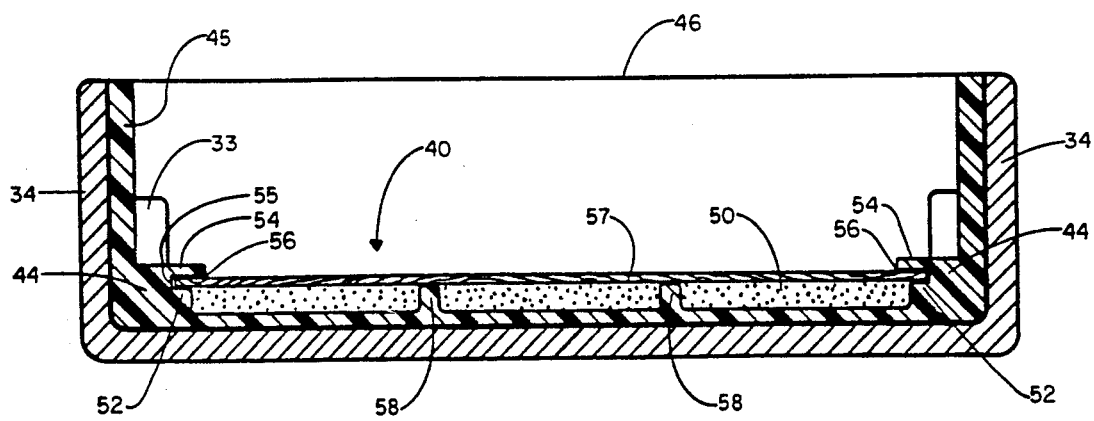
FIG. 5 is a rear cross-sectional view similar to FIG. 3 illustrating a second embodiment thereof.

FIG. 5 discloses the bed liner 40 of FIG. 3 with opposed side wall extensions 45 that extend upwardly from the side walls 44. The side wall extensions run the length of the bed liner 40 and meet with the end wall extension 46. The wall extensions 45, 46 lie adjacent to the interior of the opposed bed walls 34 and the cab wall 36. The combination of the side wall extension 45, end wall extension 46, and bed liner 40 protect the interior of the pickup truck box section 30.

Figure 6:
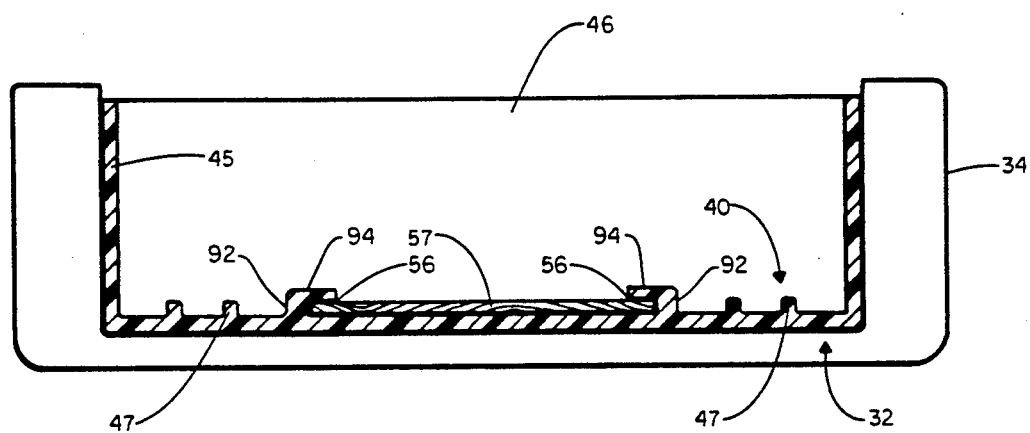
FIG. 6 is a rear cross-sectional view similar to FIG. 3 illustrating a third embodiment thereof.

In yet another version of the invention in FIG. 6, the bed liner 40 may be formed without a well 50 so that the plywood 57 can be retained directly on the planar base or floor of the bed 32. In this embodiment, a short wall 92 extends upwardly from the planar base. A flange 94 extends at an angle from the short wall 92. The planar base, short wall 92 and flange 94 cooperate to define at least one channel 56, the channel 56 being adapted to receive the panel 57. In the preferred embodiment, the angle between the flange 94 and the short wall 92 is 90°. In addition, the short wall 92 and flange 94 are preferably integrally molded with the planar base. This embodiment may also incorporate a protective rim 66 as described further below. This version, although not having the advantages of ballast, nevertheless can provide an effective non-skid surface in the bed 32, as well as protecting the decorative finish normally provided in the bed. The bed liner 40 is formed with ribs 47, opposed sidewall extensions 45, and end wall extension 46.

Figure 7:
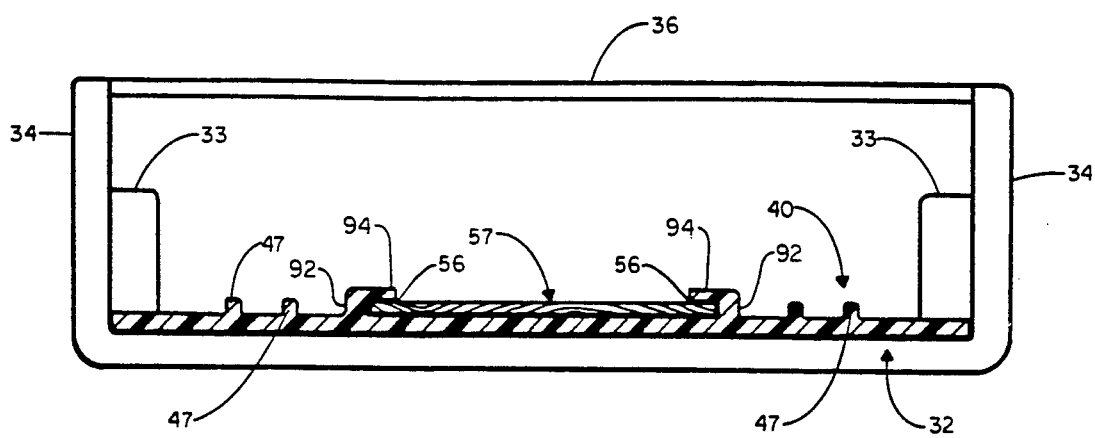
FIG. 7 is a rear cross-sectional view similar to FIG. 6 illustrating yet a fourth embodiment.

Alternatively, as shown in FIG. 7, the bed liner 40, without a well 50, can be made without the side wall extensions 45 and the end wall extensions 45.

Figure 8:
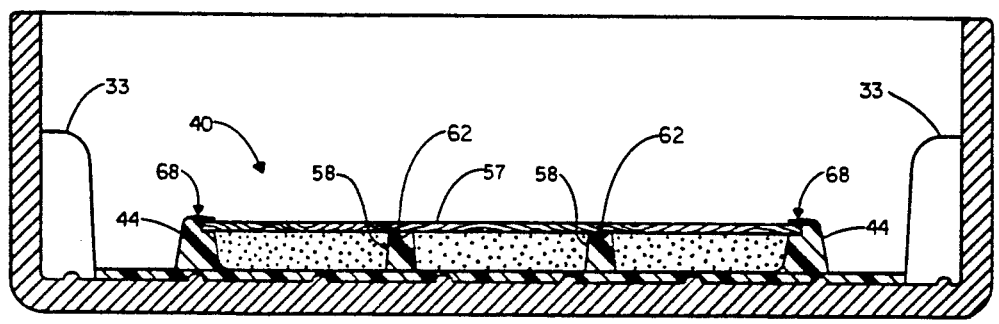
FIG. 8 is a rear cross-sectional view similar to FIG. 3 illustrating a fifth embodiment thereof.
Figure 9:
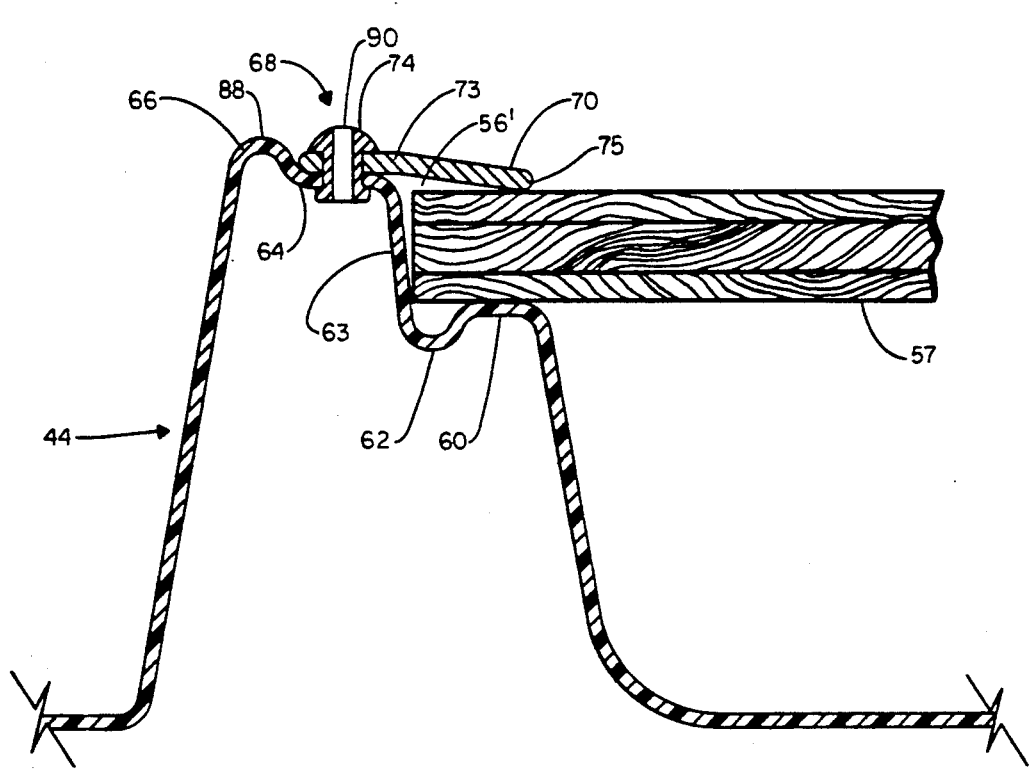
FIG. 9 is a partial sectional view of the shoulder and fastening means for attaching the ballast cover to the liner as seen in FIG. 8.

As seen in FIGS. 3, 5-7, the plywood 57 is retained in the integral channel 56 of the bed liner 40. FIGS. 8 and 9 disclose an alternative means, channel 56', for mounting the plywood 57 within the bed liner 40. In this embodiment, opposed side walls 44 comprise a shoulder 60, a drainage channel 62, a mounting surface 64 and a protective rim 66. As seen in FIG. 9, shoulder 60 is formed on the inside edge of opposing side walls 44 and is adapted to support the plywood 57. Immediately adjacent the shoulder 60 is a drainage channel 62. The drainage channel 62 is a depression suitable for channeling water and other liquid from the bed liner 40. The drainage channel 62 provides an outlet for water or other liquids which may otherwise flow into the ballast chambers of the liner 40 from opposing side walls 44.

The mounting surface 64 is disposed on a generally horizontal plane a short distance above the upper surface of the plywood 57, and spaced from the drainage channel 62 by a wall 63. A rail 70 cooperates with the wall 63 and the shoulder 60 to define the channel 56' in which the plywood 57 is received and retained. The rail 70 is secured to the mounting surface 64 by suitable fasteners 68. Preferably, a rank of openings 72 in the rail 70 receives a rivet 74 to attach the rail to the support wall 64. The rail 70 has a spring structure to it which is adapted to hold the plywood 57 firmly against the shoulder 60 to prevent rattling. In the embodiment of FIG. 9, the rail is formed of metal which has a longitudinal bend 73 which directs an edge 75 of the rail into firm contact with the plywood 57.

A protective rim 66 is adjacent to the fasteners 68 and extends along the length of the side wall 44 away from the rail 70. The protective rim 66 has an upper surface 88 which is adjacent an upper surface 90 of the fastener 68. The protective rim 66 protects the fasteners 68 from loads and cargo shifting within the bed liner which could snag on the fastener and possibly dislodge the rail 70 from its mounting.

Figure 10:
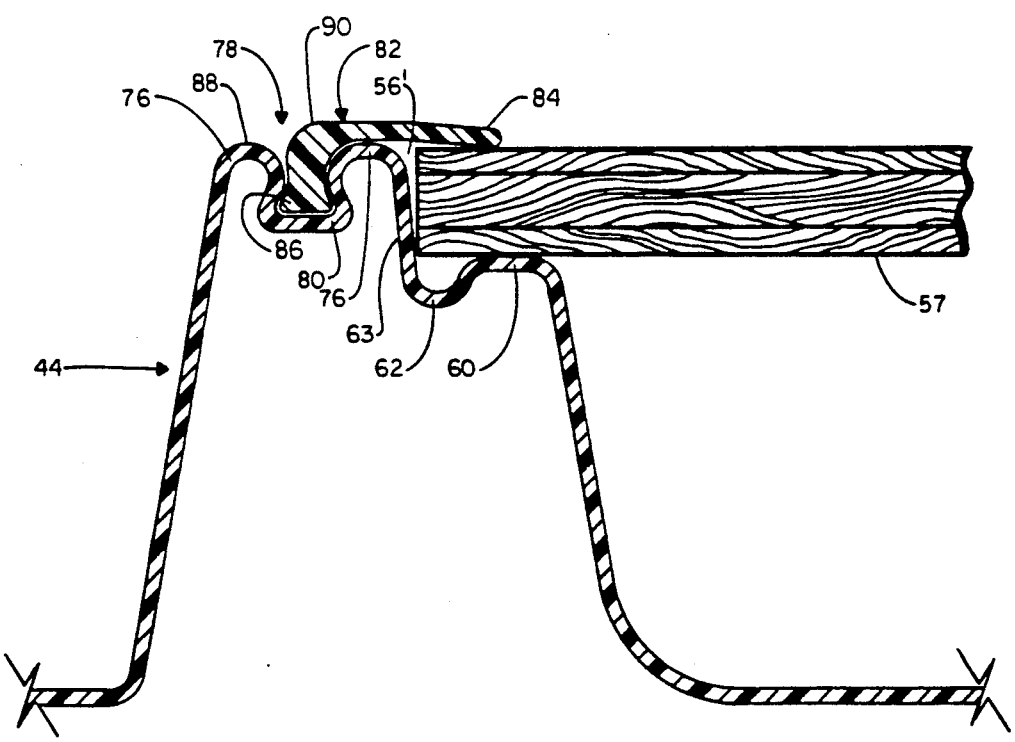
FIG. 10 is a partial sectional view similar to FIG. 9 of the shoulder and another embodiment of the fastening means for mounting the ballast cover to the liner.

FIG. 10 shows another embodiment for fastening the plywood 57 to the bed liner 40. In this embodiment, each opposing side wall 44 incorporates a shoulder 60 and a drainage channel 62 on the interior surface, as previously shown in FIG. 9. The side walls 44 at an upper portion thereof further incorporate a pair of ribs 76 which define a dovetail retaining channel 78. In other words, the channel 78 has a base 80 wider than the opening of the channel defined by the ribs 76.

A rail 82, L-shaped in cross section cooperates with the shoulder 60 and the wall 63 to define the channel 56'. The rail 82 is similar to the rail 70 of FIG. 9 in that it is spring like in construction, but it is fastened to the side wall 44 differently. A longitudinal bend 86 on the rail 82 is complementary in cross sectional shape to the dovetail channel 78 and is received therein. An edge 84 of the rail is in firm contact with the plywood 57 to hold it against the shoulder 60.

FIG. 8 also illustrates ribs 58' within the walls 50' to provide additional support for the plywood. It can be seen that the ribs also include drainage channels 62 for the purpose described above. It will be understood that the ribs 58 will preferably be parallel to the side walls 44, but may also be in other configurations consistent with providing adequate support for the plywood 57. In addition, it will be understood that the rail 70 may be a single U-shaped piece for attachment to both side walls 44 and the front wall 46 or, alternatively, multiple pieces for separate attachment to each wall.

From the foregoing, the usage of various bed liners for retaining ballast loads has been shown to be effective in different ways for different circumstances. A result of this invention is the ability to deploy ballast efficiently with maximum positioning of load where it is needed and provide an effective, low cost, replaceable non-skid surface to cover the ballast. The importance of this is not lost on the truck operator who pays for inefficient usage of ballast at the gas pump and with a bad ride or fatigued suspension systems. The advances brought forward by this disclosure represent embodiments useful for practicing the invention, and do not represent limitations thereon. It is understood that the present invention may be modified or varied further without detracting from the spirit or scope of the teachings contained herein.

The embodiments of the present invention in which an exclusive property or privilege is claimed are defined as follows:

1. A protective liner for a pickup truck bed having a bed floor, said liner comprising a floor adapted to rest upon the bed floor, a pair of opposing side walls, a rear wall, and a front wall, said floor, side walls, rear wall, and front wall being integrally connected to form a well, one of said pair of side walls and said front wall having means to receive and retain a panel to cover the well and each of said pair of side walls having a drainage channel formed thereon for directing fluids away from said well, wherein said well can retain substantially dry ballast for providing stability and traction for the pickup truck.

2. A protective liner according to claim 1 wherein said means comprise a channel defined by a shoulder and a flange connected by a web mounted on one of said side walls and said front wall.

3. A protective liner according to claim 2 wherein said floor has a rib extending upwardly therefrom intermediate said side walls to support said panel.

4. A protective liner according to claim 3 wherein said rib is generally parallel to said side walls.

5. A protective liner according to claim 2 wherein said panel is formed of plywood received in said channel.

6. A protective liner according to claim 2 wherein said ballast is formed of a loose aggregate received in said well.

7. A protective liner according to claim 2 wherein said side wall has a mounting support which is formed in a one piece molding incorporating said shoulder and said web and the flange is formed by a separate rail attached to the mounting support.

8. A protective liner according to claim 7 wherein said rail has one edge which contacts the panel, and another portion which is riveted to the mounting support.

9. A protective liner according to claim 7 wherein said rail is L-shaped in cross section, one edge of which contacts said panel, another edge of which is received within a locking channel wherein said locking channel extends along an upper surface of said side wall.

10. A protective liner according to claim 3 wherein said rib further comprises a drainage channel formed thereon which is adapted to channel fluids away from said well.

11. A protective liner for a pickup truck bed having a bed floor, said liner comprising a floor adapted to rest upon the bed floor, a pair of opposing side walls, a rear wall, and a front wall, said floor, side walls, rear wall and front wall being integrally connected to form a well, one of said pair of side walls and said front wall having means to receive and retain a panel to cover the well, a protective rim molded to said one of said pair of side walls adjacent the means to receive and retain the panel and a drainage channel formed on each of said pair of side walls for directing fluids away from said well, wherein said well can retain ballast for providing stability and traction for the pickup truck and said protective rim is adapted to protect said means from lateral impact.

12. A protective liner for a pickup truck bed having a bed floor, said liner comprising a floor adapted to rest upon the bed floor, a pair of opposing side walls, a rear wall and a front wall, siad floor, side walls, rear wall and front wall being integrally connected to form a well, one of said pair of side walls and said front wall having a channel defined by a shoulder and a flange connected by a web mounted thereon, said channel adapted to receive and retain a panel to cover the well, a protective rim mounted to said one of said pair of side walls adjacent the channel, a rib extending upwardly from said floor intermediate said side walls to support said panel and a drainage channel formed on said rib which is adapted to channel fluids away from said well, wherein said well can retain ballast for providing stability and traction for the pickup truck and said protective rim is adapted to protect said channel from lateral impact.

* * * * *